(12) United States Patent
Van Rotterdam

(10) Patent No.: US 8,965,899 B1
(45) Date of Patent: Feb. 24, 2015

(54) PROGRESSIVE INDEXING FOR IMPROVED AD-HOC QUERY PERFORMANCE

(75) Inventor: Jeroen Van Rotterdam, Berkeley, CA (US)

(73) Assignee: EMC Corporation, Hopkinton, MA (US)

( * ) Notice: Subject to any disclaimer, the term of this patent is extended or adjusted under 35 U.S.C. 154(b) by 48 days.

(21) Appl. No.: 13/341,423

(22) Filed: Dec. 30, 2011

(51) Int. Cl.
*G06F 7/00* (2006.01)
*G06F 17/30* (2006.01)

(52) U.S. Cl.
USPC ........................................ 707/741

(58) Field of Classification Search
CPC ............... G06F 17/30336; G06F 17/30327
USPC .............. 707/708, 737, 741, 743, 744, 736
See application file for complete search history.

(56) References Cited

U.S. PATENT DOCUMENTS

| | | | |
|---|---|---|---|
| 6,175,836 B1 * | 1/2001 | Aldred | 1/1 |
| 6,778,977 B1 * | 8/2004 | Avadhanam et al. | 707/737 |
| 6,925,463 B2 * | 8/2005 | Bhattacharjee et al. | 1/1 |
| 7,209,923 B1 * | 4/2007 | Cooper | 1/1 |
| 2004/0199530 A1 * | 10/2004 | Avadhanam et al. | 707/100 |
| 2005/0138007 A1 * | 6/2005 | Amitay | 707/3 |
| 2006/0195476 A1 * | 8/2006 | Nori et al. | 707/104.1 |
| 2007/0058871 A1 * | 3/2007 | Deligiannakis et al. | 382/224 |
| 2008/0091714 A1 * | 4/2008 | Idicula et al. | 707/103 R |
| 2011/0179008 A1 * | 7/2011 | Talius | 707/708 |

* cited by examiner

*Primary Examiner* — Hung T Vy
(74) *Attorney, Agent, or Firm* — Barry N. Young

(57) ABSTRACT

The invention progressively indexes a database by building partial indexes over subsets of the data are built as the data is scanned, i.e., traversed, during execution of ad-hoc queries. Indexes are built as ad-hoc queries "touch" the data. This permits ad-hoc queries to utilize partial indexes built by other ad-hoc queries. If an ad-hoc query scans more data during execution than was previously indexed, the ad-hoc query will utilize the existing partial indexes to the extent they are relevant while adding to them or building additional partial indexes as the query executes.

20 Claims, 7 Drawing Sheets

PROGRESSIVE INDEXING FOR IMPROVED AD-HOC QUERY PERFORMANCE

BACKGROUND

This invention is related generally to databases, and more particularly to improving query performance in large databases.

Enterprises commonly store enterprise data in large, frequently distributed, database systems. Database systems generally employ indexes to improve query performance. Indexes provide pointers to data in databases that are encompassed within the index definitions, and speed up retrieval of data by allowing queries to locate data quickly that satisfies the queries without having to scan the entire dataset. Creating an index typically involves traversing the content of the database and building an index structure that represents the entire dataset. For large databases, this can be very costly and time consuming, frequently requiring many hours. For certain types of data that are infrequently accessed, for example, only for electronic discovery in litigation using ad-hoc queries, the cost of building an index of the database may be too expensive and not be worth the effort. In other instances, the database may be so large that indexing is impractical or impossible. For example, e-mail archives of large enterprises are frequently so huge that it may be impossible to index all of the existing content. Moreover, an index based upon one ad-hoc query may be of little value for a future ad-hoc query. Thus, if in the absence of a relevant index an ad-hoc query that scans the dataset of a database might require a long time to complete, the next query will have to scan the database again and will similarly take several hours to complete. This results in inefficient query performance.

It is desirable to provide systems and methods that address the foregoing and other problems of ad-hoc query performance in large databases, and it is to these ends that the present invention is directed.

DESCRIPTION OF PREFERRED EMBODIMENTS

The invention is particularly well adapted for use with large databases that store infrequently accessed data which is accessed using ad-hoc queries, and will be described in that context. However, as will be appreciated, this is illustrative of only one utility of the invention and the invention has applicability to other databases more generally.

As will be described in more detail below, the invention does not attempt to index the entire data set of a large database before executing queries on the database. Thus, it avoids the cost in time and resources that attend full indexing approaches. Rather, the invention employs a new progressive indexing approach that builds partial indexes over subsets of the data as the data is scanned, i.e., traversed, during execution of ad-hoc queries. The invention progressively builds indexes as one or more ad-hoc queries "touch" the data. This permits ad-hoc queries to utilize partial indexes built by other ad-hoc queries if they are querying the right subset of data. If an ad-hoc query scans more data during execution of the query than was previously indexed, the query will utilize the existing partial indexes to the extent they are relevant while adding to them or building additional partial indexes as the query executes.

Progressive indexes are preferably defined in accordance with the invention at a container level that oversees all of the data that will be indexed over time, while partial indexes are preferably deployed at various sub-container levels as the partial indexes are developed by ad-hoc queries scanning the data. As used herein, the terms "container" and "sub-container" refer to abstractions of a data collection hierarchy. In more physical data structure terms, "container" may refer, for instance, to the file system level of a data structure, while "sub-container" may progressively refer to lower levels of the data structure such as directories, files, documents, etc. At the sub-container levels, administration modules may maintain information such as lists or metadata indicating what content is indexed in each sub-container and whether an index over a sub-container is partial or complete. Once an index at a sub-container level is complete, a query optimizer may take advantage of the index at the sub-container level in executing queries. Over time, as more and more indexes at the sub-container level become complete, ad-hoc queries will be executed increasingly faster and ad-hoc query performance will be improved.

Figure 1:
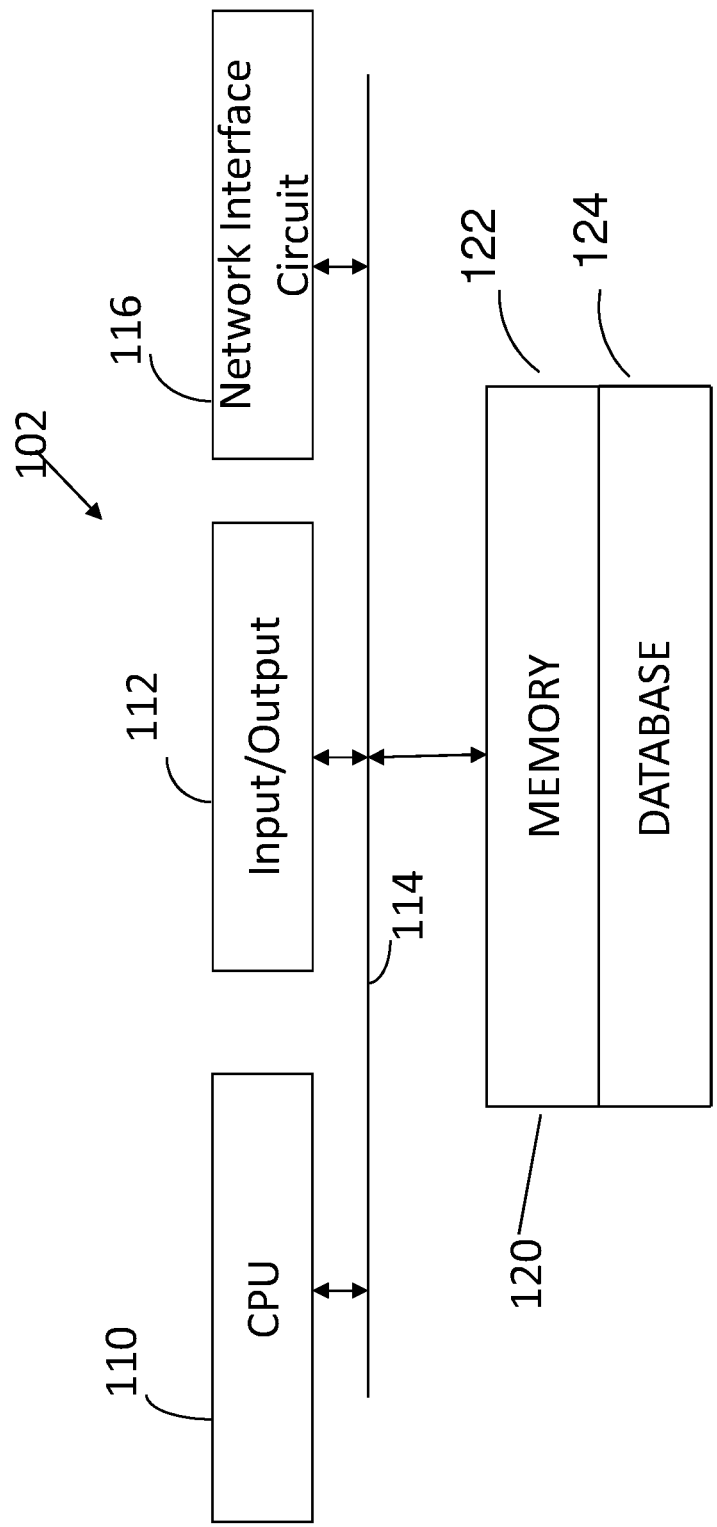
FIG. 1 is a diagrammatic view of a database system of the type with which the invention may be used.

FIG. 1 illustrates an example of the architecture of a node 102 of a database system configured to perform processes and operations in accordance with the invention. The node 102 may comprise a computer server system 110 (which may comprise a single CPU or may be a multi-processor system comprising a plurality of CPUs) connected to input/output (I/O) devices 112 by a bus 114. The I/O devices may be standard computer system input and output devices. A network interface circuit 116 may also be connected to bus 114 to allow the node to operate in the networked environment of a database. Clients (not shown) may communicate with the database node 102 using either the I/O devices or the network interface circuit. The node may have storage 120 including a main memory 122 comprising physical storage media connected to the bus that embodies executable instructions to control the operations of the computer system and a database 124. Database 124 may be one segment of a larger distributed database system.

Figure 2:
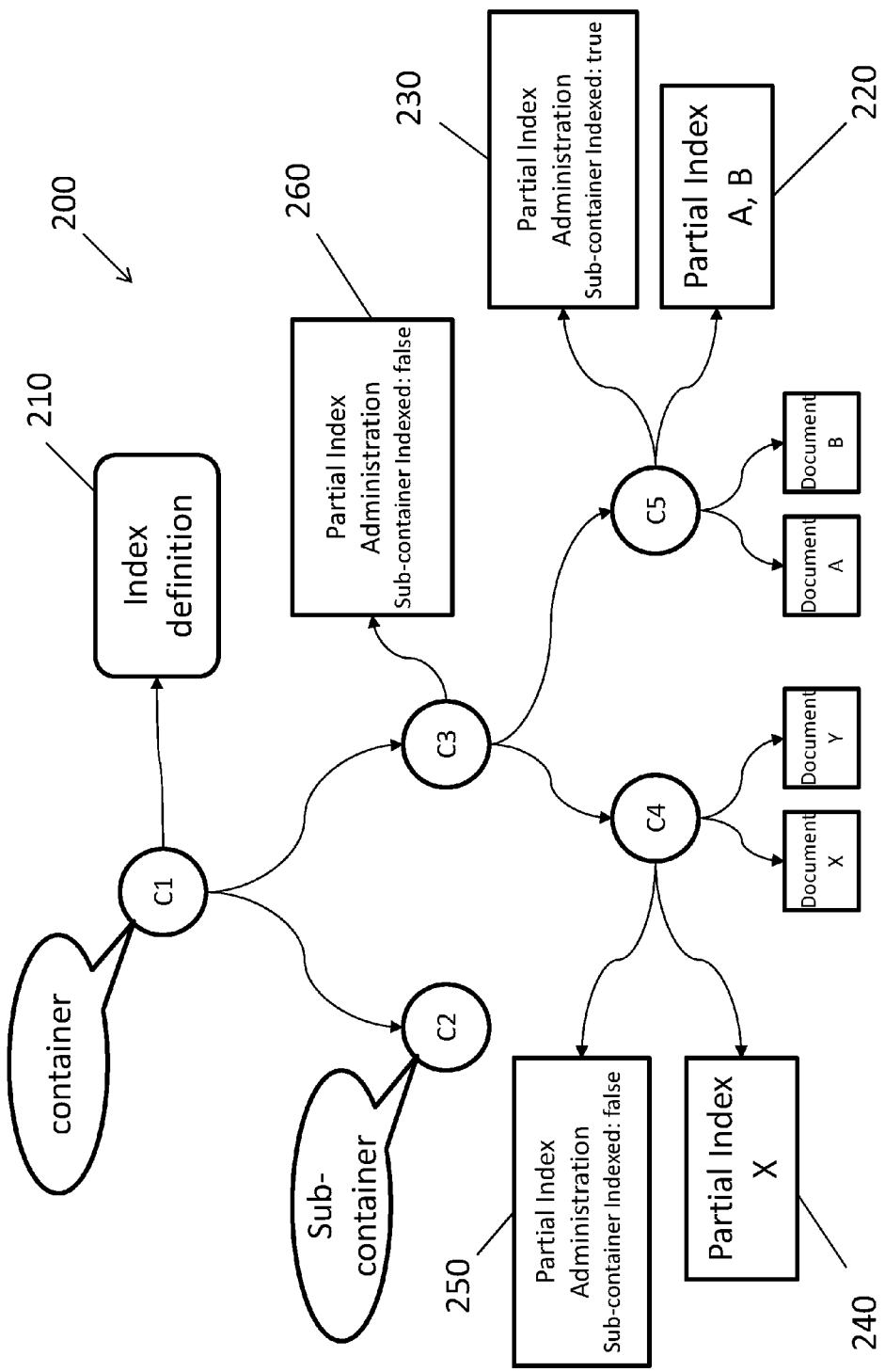
FIG. 2 is a diagrammatic view that illustrates an embodiment of a partially indexed database in accordance with the invention.

FIG. 2 illustrates diagrammatically a subset of data in a database 200 that has been partially indexed in accordance with the invention. Database 200 may be a partitioned database that stores flat or unstructured data in data categories, such as Windows documents that have associated metadata which characterizes certain aspects of the data such as author, time of modification, when created, etc., or a relational database comprising a table that is partitioned on rows or columns. The database may also be unpartitioned and store structured content such as XML or JSON data that is inherently hierarchical in nature, where the hierarchical information identifies portions of the data to which an ad-hoc query may be directed.

As shown in FIG. 2, database 200 has a hierarchical data structure, comprising a top (first) level container C1, second level sub-containers C2 and C3, third level sub-containers C4 and C5, and fourth level sub-containers comprising documents X, Y, A and B. In the state depicted in the figure, the database has been partially indexed, i.e., some sub-containers have been indexed as a result of prior ad-hoc queries touching the content, and some sub-containers have not been indexed. An index definition 210 may be defined at the container level C1. The index definition may be used by the ad-hoc query. Ad-hoc queries will read the index definition to find out which indexes they need to apply while traversing the content that has not been indexed.

Each sub-container may have an administration module comprising metadata, for example, that indicates whether content within that sub-container and its descendent sub-containers is indexed, and whether the indexing over the sub-container is complete. As shown in the figure, sub-container C3 has two descendent sub-containers C4 and C5. Sub-container C5 contains two documents, document A and document B, both of which have been indexed in a partial index 220. Since these two documents are the only content within the sub-container, a partial index administration module 230 associated with sub-container C5 has a flag set to "true" to indicate that the all of the content in the sub-container has been fully indexed. Sub-container C4 also contains two documents, document X and document Y. Sub-container C4 also has a partial index 240 in which only document X has been indexed. Thus, a partial index administration module 250 associated with the sub-container has a flag set to "false" indicating that the sub-container has not been fully indexed.

Sub-container C3 is a parent container containing descendent (child) sub-containers, C4 and C5. Since not all of the children of sub-container C3 have been fully indexed (i.e., C4), a partial index 260 associated with the sub-container C3 has a flag set to "false" to indicate that not all the content of that sub-container has been indexed.

Figure 3:
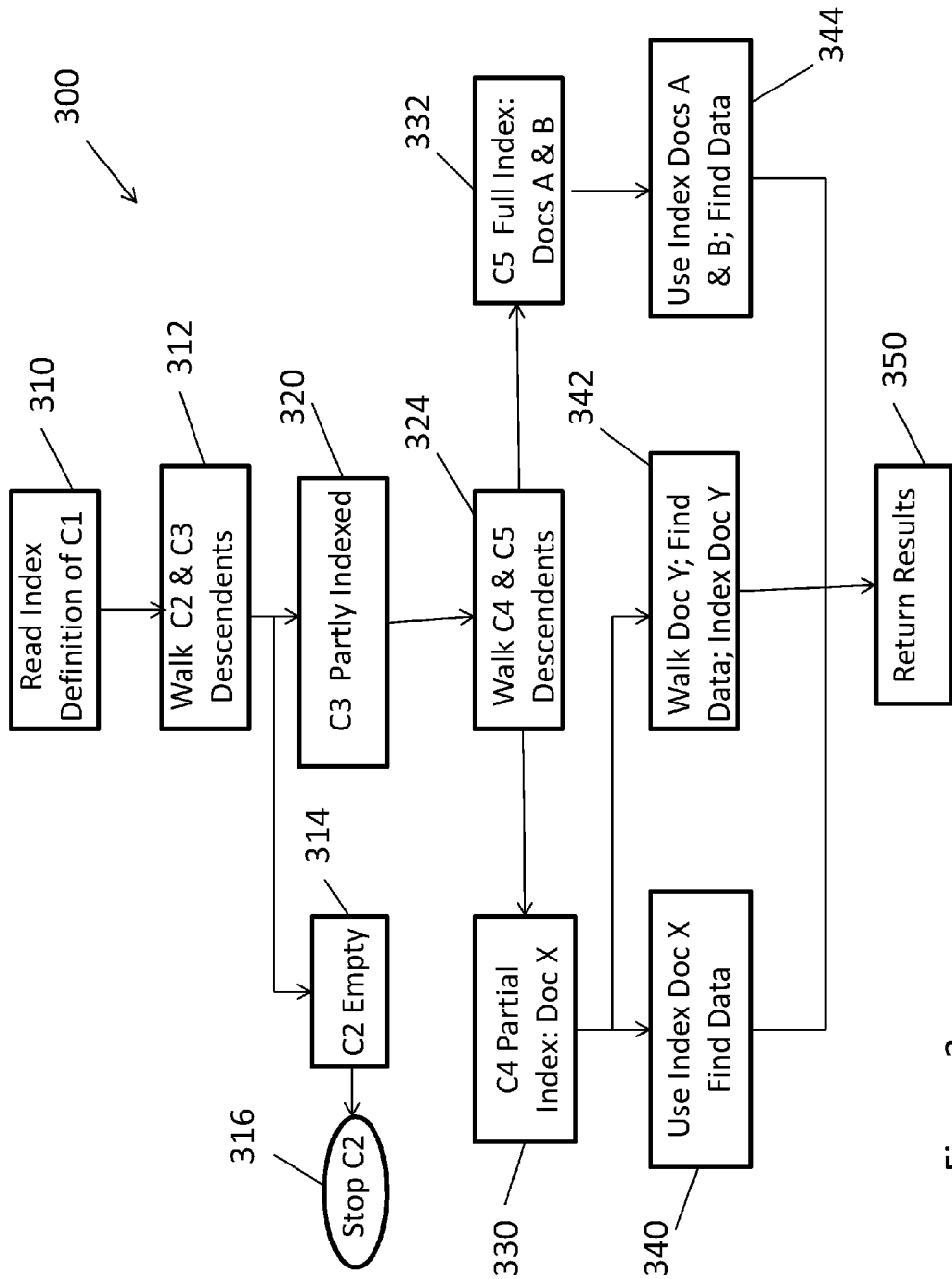
FIG. 3 illustrates a process for executing an ad-hoc query and progressively indexing the database of FIG. 2.

FIG. 3 is a flow chart illustrates a process 300 for executing an ad-hoc query and progressively indexing the database 200 of FIG. 2. Referring to FIG. 3, at 310 an ad-hoc query reads the index definition 210 of container C1 (FIG. 2), and at 312 starts to walk (traverse the content to find relevant results) the descendents sub-containers C2 and C3. At 314, the ad-hoc query determines that sub-container C2 has no content and is empty. Accordingly, at 316 the ad-hoc query takes no further action with respect to sub-container C2. At step 320, the ad-hoc query determines from the partial index administration module 260 (FIG. 2) that sub-container C3 has been partially indexed, so at 324 it begins to walk the content of descendent sub-containers C4 and C5. The ad-hoc query determines at 330 from the partial index administration module 250 (FIG. 2) that sub-container C4 has been partially indexed, and determines at step 332 from the partial index administration module 230 (FIG. 2) that sub-container C5 has been fully indexed. Accordingly, at step 340, the ad-hoc query may use the partial index 240 to find relevant data in document X, and at step 342 walks document Y to index the document and find relevant data. The ad-hoc query returns relevant results found in documents X and Y at steps 340 and 342 in step 350. As will be explained more fully in connection with FIGS. 4A-D, in the process of walking document Y at 342, the ad-hoc query creates a partial index of the content of document Y touched by the ad-hoc query, and adds this partial index to the partial index 340. Since both documents X and Y of sub-container C4 have now become indexed, the partial index administration module 250 of sub-container C4 is updated by setting the flag to true to indicate that sub-container C4 is now fully indexed.

Since at step 332, the ad-hoc query determined that sub-container C5 had been fully indexed, the ad-hoc query uses the full index at 344 to obtain relevant results from the content of documents A and B, and returns the relevant results at 350 along with the relevant results from documents X and Y obtained by the ad-hoc query at 340 and 342. Furthermore, since sub-containers C4 and C5 have been now fully indexed, the flag of the partial index administration module 260 of sub-container C3 is updated from "false" to "true", since all sub-containers of C3 have been fully indexed. The indexes may be used with future ad-hoc queries to locate and return results more quickly without having to scan the data to improve ad-hoc query performance.

FIG. 4A-D comprise a sequence of diagrammatic views that illustrate an example of progressive indexing in accordance with the invention of a portion 400 of a database. As shown in the figures, database 400 may comprise a container C1 and sub-containers C2 and C3. The sub-containers may contain collections of Microsoft Office documents. Sub-container C2 may contain three documents, e.g., a PowerPoint (PPT) document X, a Word document Y, and an Excel document Z. Sub-container C3 may similarly contain a collection of Word documents A and B.

Figure 4A:
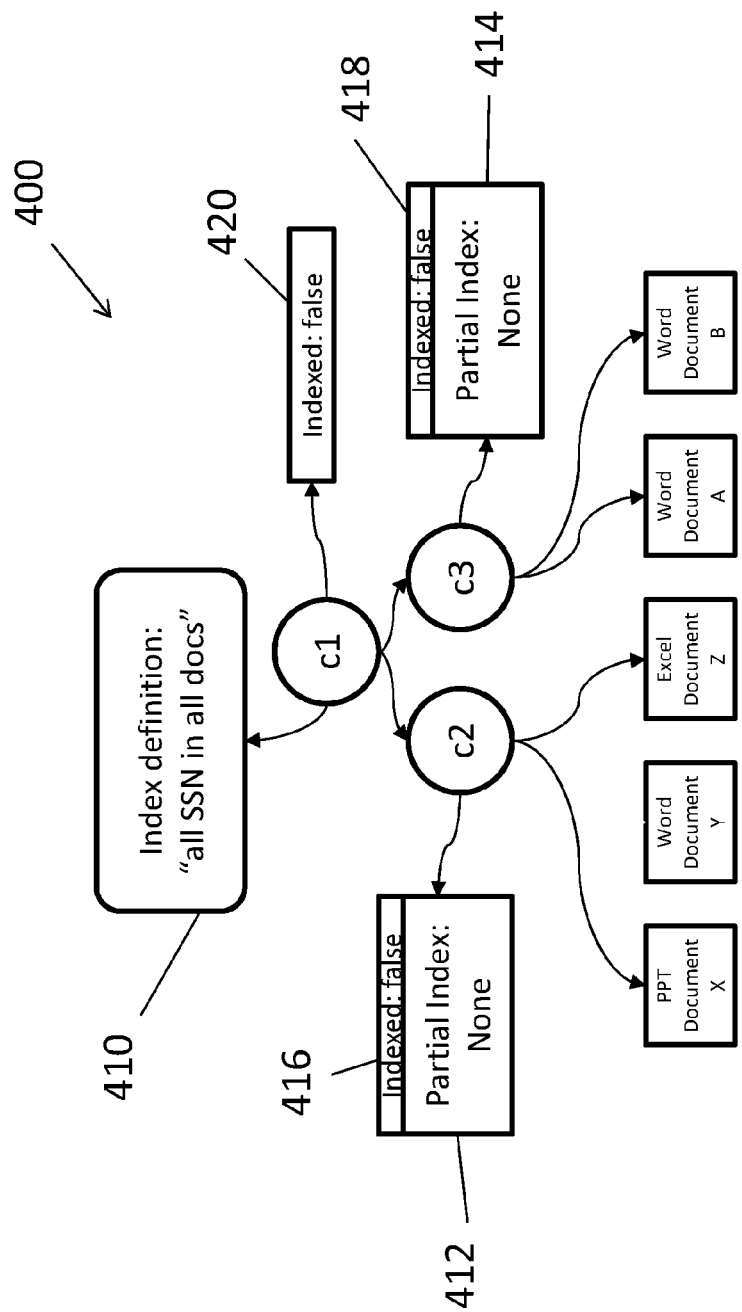
FIGS. 4 A-D are a sequence of diagrammatic views that illustrate an example of progressive indexing of a database upon executing ad-hoc queries.

FIG. 4A illustrates the initial state of the database before any queries have been run and when nothing has been indexed. Only the index definition 410, assumed for purposes of this example to be: "index all Social Security Numbers (SSN) in all documents", has been applied to container C1. Thus, partial indexes 412 for sub-container C2 and 414 for sub-container C3 indicate "none" and their corresponding index flags 416 and 418, respectively, indicate "false". Likewise, the index flag 420 associated with container C1 is set to "false".

Figure 4B:
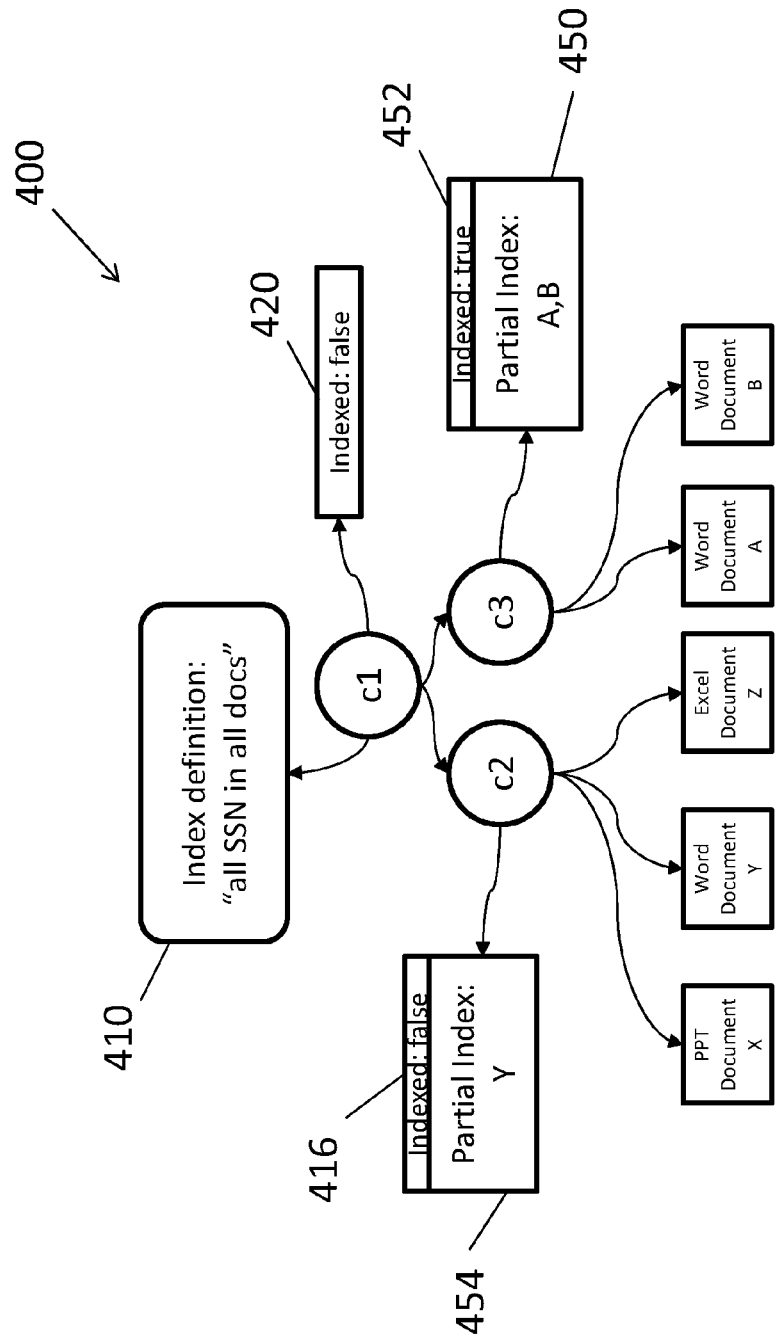

FIG. 4B illustrates the state of the database after a first ad-hoc query, which for this example is assumed to be: "find all Word that documents that have an SSN" has been run. In running this query, only the contents of Word documents are scanned and indexed. Excel and PowerPoint documents are skipped. After this first ad-hoc query, documents Y, A and B have been indexed. Sub-container C3 is now fully indexed, as indicated by its partial index 450 and its index flag 452 which is set to "true". However, sub-containers C1 and C2 have been only partially indexed as shown by the partial index 454 for container C2 and the index flags 416 and 420 for sub-container C2 and container C1, respectively.

Figure 4C:
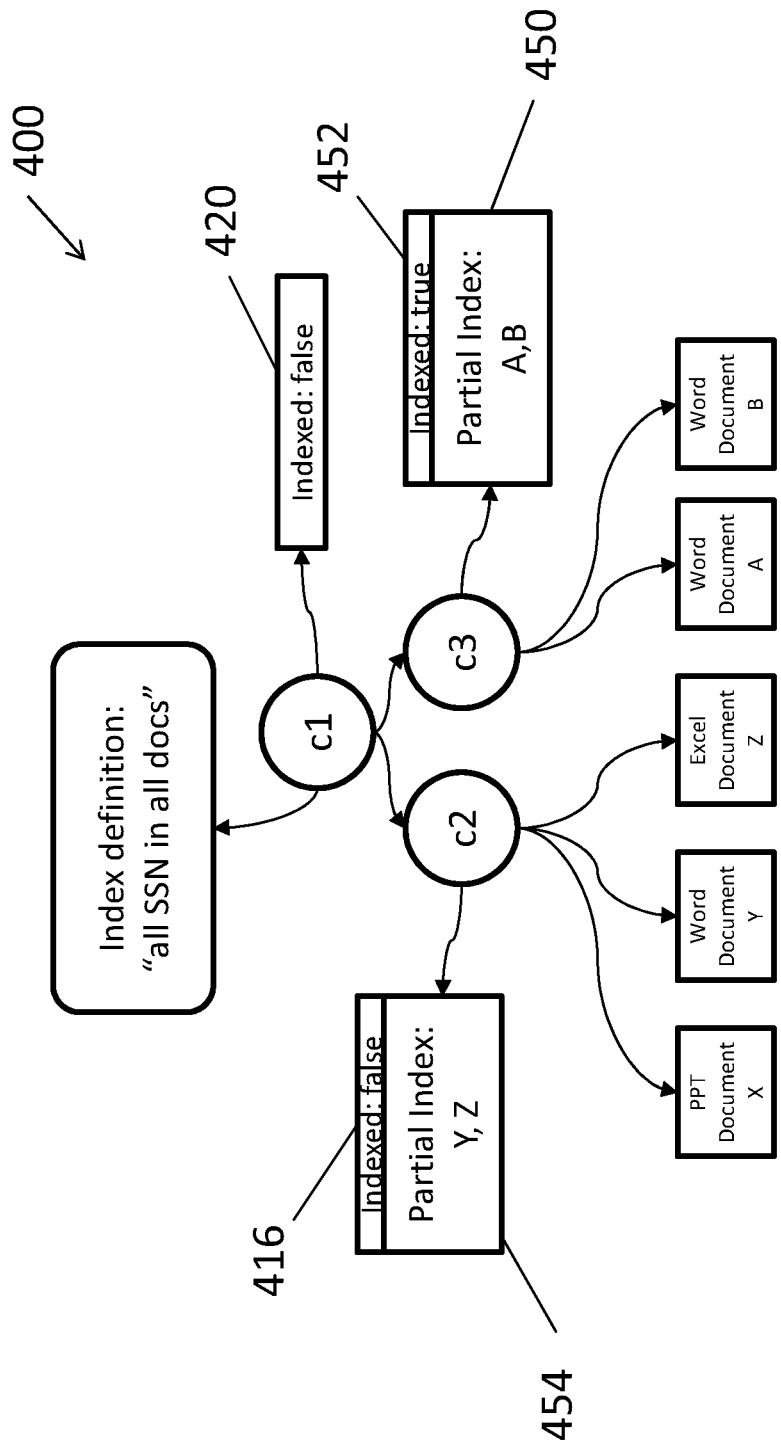

FIGS. 4B and 4C illustrate, respectively, the states of the database before and after a second ad-hoc query. The state of the database shown in FIG. 4B before the second ad-hoc query is the same as the state following the first ad-hoc query. Assuming for the purposes of this example that the second ad-hoc query is: "find all Word or Excel documents that have an SSN", all non-Word and non-Excel documents, i.e., PowerPoint documents, are skipped in this query. Only the contents of Word and Excel documents are touched by the query. Since all Word documents were previously indexed, this second ad-hoc query may use the partial index 454 for document Y and the full index 450 for documents A and B. It scans and indexes only the content of Excel document Z. After the second ad-hoc query, the partial index 454 for sub-container C2 indicates that documents Y and Z have been indexed. However, since sub-container C2 and container C1 have not been fully indexed, their flags 416 and 420, respectively, still indicate "false".

Figure 4D:
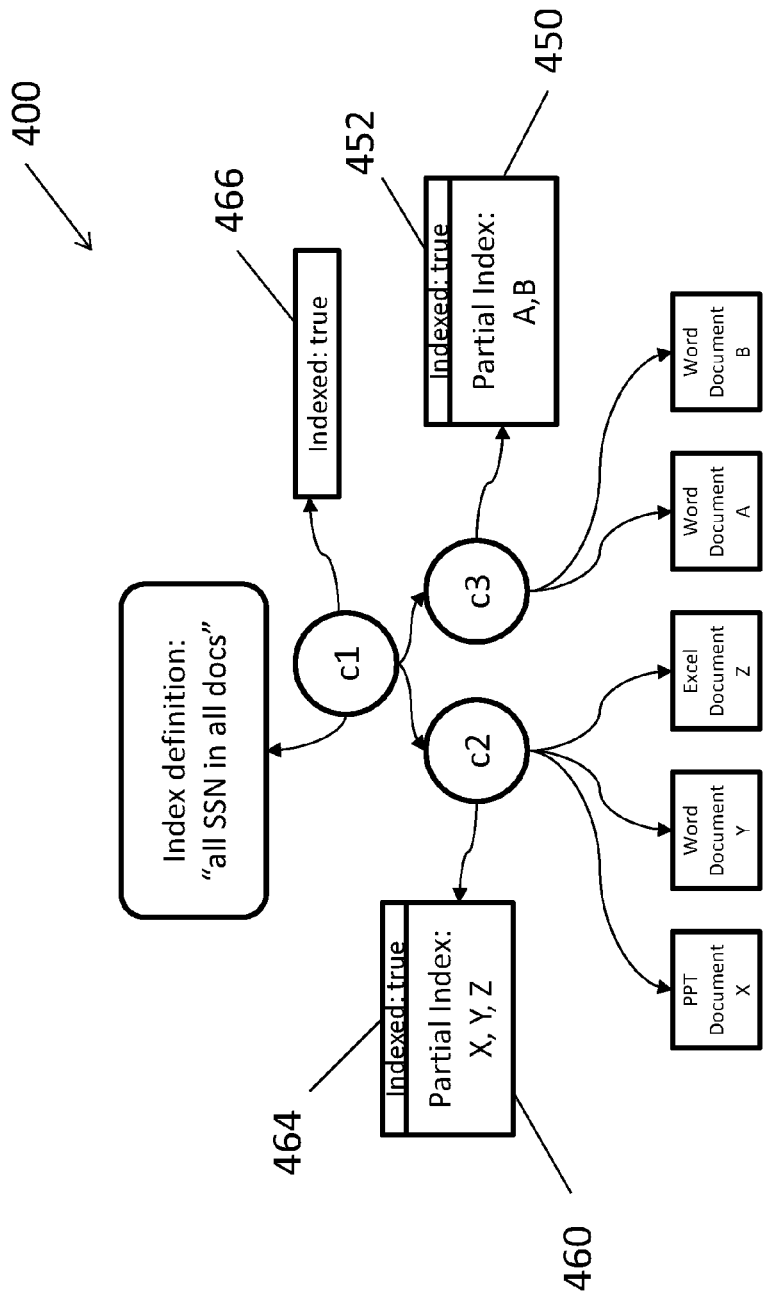

FIGS. 4C and 4D illustrate, respectively, the states of the database before and after a third ad-hoc query. Before the third ad-hoc query, the state of the database is the same as illustrated in FIG. 4C following the second ad-hoc query. Assuming for purposes of this example that the third ad-hoc query is: "find all Word or Excel or PowerPoint documents that have an SSN". This third ad-hoc query is able to use the index 450 on sub-container C3 because it is complete, and the partial index 460 for documents Y and Z of sub-container C2.

After the third ad-hoc query, sub-container C2 has now been fully indexed, as indicated at 460 and by its corresponding flag 464. Thus, all sub-containers C2 and C3 are now fully indexed, and since all of the children are now fully indexed, flag 466 of container C1 is now set to "true". Since the entire database has now been indexed, all future queries can use these indexes without the need for further indexing of documents.

As illustrated by the foregoing example, progressive indexing of a database in accordance with the invention during the execution of ad-hoc queries results in progressively greater portions of the database being indexed, and, accordingly, increasingly enhances the performance of ad-hoc queries while affording the cost in time and resources, and perhaps the lack of utility for future ad-hoc queries, of indexing a large database in advance.

While the invention has been described with respect to preferred embodiments, it will be appreciated by those skilled in the art that changes in these embodiments may be made without departing from the principles and spirit of the invention, the scope of which is defined in the appended claims.

The invention claimed is:

1. A method of enhancing query performance of ad-hoc queries executed on data stored in a database, comprising:
   executing an ad-hoc query on said data in said database;
   traversing a first subset of said data in said database during said executing said ad-hoc query;
   indexing categories of content of said data in said first subset during said traversing to create a first partial index of said categories of data content of said first subset; and
   repeating said foregoing steps while traversing a second subset of data in said database to create a second partial index of the categories of data content of said second subset of data;
   wherein said first and second partial indexes progressively index said database to reduce the amount of data traversed and the execution time of subsequent ad-hoc queries executed on said database.

2. The method of claim 1 further comprising progressively adding to said partial indexes by subsequently executing one or more additional ad-hoc queries to increase the data content indexed in said partial indexes of the categories of data content.

3. The method of claim 1, wherein said database comprises a hierarchical data structure, and said method further comprises applying an index definition to a top level container of data in said hierarchical data structure, said index definition being used to create said first partial index.

4. The method of claim 3 further comprising creating additional partial indexes of data content in sub-containers at different levels lower than said top level container of said hierarchical data structure.

5. The method of claim 4, wherein said ad-hoc queries use partial indexes to identify sub-containers within said hierarchical data structure to scan for data content relevant to said ad-hoc queries.

6. The method of claim 4 further comprising associating metadata with each sub-container to indicate whether indexing of data content in said sub-container is complete.

7. The method of claim 1, wherein said database comprises a partitioned database that stores unstructured data.

8. The method of claim 1, wherein said databases is an unpartitioned database that stores data that comprises structured content.

9. The method of claim 8, wherein said structured content data comprises one or more of XML data and JSON data.

10. A method of enhancing query performance of ad-hoc queries executed on data stored in a database, comprising:
    executing an ad-hoc query on said data in said database;
    indexing categories of data content of subsets of said data stored in said database while traversing said data content during said executing said ad-hoc query to create one or more partial indexes of said categories of data content of one or more of said subsets of the data, and
    repeating said executing and indexing to progressively build on said partial indexes of said categories of data content while executing one or more ad-hoc queries on said data.

11. The method of claim 10, wherein said progressively building comprises using an index definition to define the content in a subset of the data to be indexed by said one or more ad-hoc queries to create said partial indexes.

12. The method of claim 11, wherein said index definition is defined by an ad-hoc query.

13. The method of claim 10, wherein data in said database is organized in hierarchically structured containers, and said partially indexing comprises applying an index definition that defines the data content to be indexed in said hierarchically structured containers.

14. The method of claim 13, wherein each hierarchically structured container has an associated administration module, and the method further comprises indicating by said administration module whether indexing of the data content of said container is complete.

15. The method of claim 10, wherein said partially indexing said categories of data content comprises executing an ad-hoc query, and creating said one or more partial indexes at different container levels of said hierarchically-structured containers while executing said ad-hoc query.

16. Non-transitory computable readable media storing executable instructions for controlling the operation of a computer to:
    execute an ad-hoc query on data in a database;
    traverse a first subset of said data in said database during executing said ad-hoc query;
    index categories of the content of said data in said first subset during traversing the first subset to create a first partial index of said categories of the content of said data of said first subset;
    repeat said foregoing steps while traversing a second subset of data in said database to create a second partial index of categories of the data content of said second subset of data; and
    wherein said first and second partial indexes progressively index said database to reduce the amount of data traversed and the execution time of subsequent ad-hoc queries executed on said database.

17. The non-transitory computer readable media of claim 16 further comprising instructions for progressively adding to said partial indexes by executing one or more subsequent ad-hoc queries to increase the data content in said partial indexes.

18. The non-transitory computer readable media of claim 16, further comprising instructions to progressively add to said partial indexes and instructions for applying index definitions to said subsets of data, and said instructions to execute said ad-hoc queries comprise instructions that use said index definitions to identify the subsets of data traversed by said ad-hoc queries.

19. The non-transitory computer readable media of claim 16, wherein said database comprises a hierarchical data structure, and further comprising instructions for creating partial indexes for data containers at different levels of said data structure.

20. The non-transitory computer readable media of claim 19 further comprising instructions for providing information for each said data container to indicate whether indexing of such data container is complete.

\* \* \* \* \*